S. A. SHIPP & L. LUND.
DISINFECTING DEVICE.
APPLICATION FILED JUNE 10, 1907.
915,629.
Patented Mar. 16, 1909.
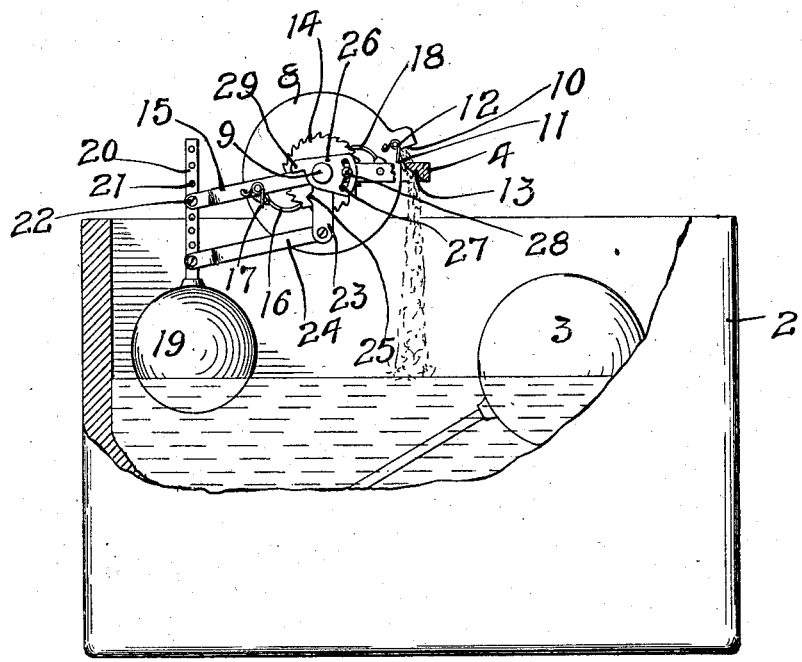
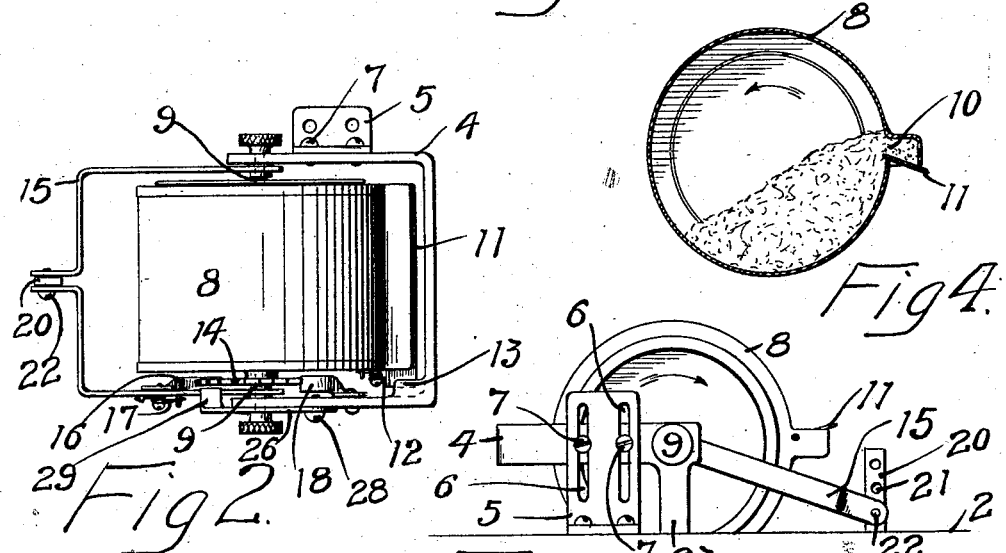
WITNESSES
INVENTORS
SVEN A. SHIPP
LAWRENCE LUND
BY
THEIR ATTORNEYS

UNITED STATES PATENT OFFICE.

SVEN A. SHIPP AND LAWRENCE LUND, OF MINNEAPOLIS, MINNESOTA, ASSIGNORS TO AUTOMATIC DISINFECTING CO., OF MINNEAPOLIS, MINNESOTA, A CORPORATION OF MINNESOTA.

DISINFECTING DEVICE.

No. 915,629.      Specification of Letters Patent.      Patented March 16, 1909.

Application filed June 10, 1907. Serial No. 378,101.

*To all whom it may concern:*

Be it known that we, SVEN A. SHIPP and LAWRENCE LUND, of Minneapolis, Hennepin county, Minnesota, have invented certain new and useful Improvements in Disinfecting Devices, of which the following is a specification.

Our invention relates to disinfecting apparatus and particularly to the means for delivering the disinfecting material at predetermined intervals.

The invention consists generally in means controlled by the movement of a tank float for delivering a quantity of the disinfecting material at predetermined intervals of time.

In the accompanying drawings, forming part of this specification, Figure 1 is a front elevation of a water closet tank with the wall broken away illustrating the application of our invention thereto. Fig. 2 is a plan view of the apparatus for delivering the disinfecting material. Fig. 3 is a side elevation illustrating the means for securing the device on the tank. Fig. 4 is a sectional view of the drum or receptacle in which the disinfecting material is placed.

In the drawing, 2 represents a water closet tank having the usual float 3 for controlling the admission of water thereto.

4 is a frame and 5 a bracket secured to the wall of the tank and having slots 6 and screws 7 passing therethrough into said frame, and whereby said frame is rendered vertically adjustable on the tank. 8 is a drum having pivots 9 in said frame and provided with a discharge opening 10 on one side that is normally covered by a valve 11 having a spring closing device 12. When this valve is opened a disinfecting material is allowed to fall out by gravity into the tank 2. A stop 13 is provided on the frame in the path of the valve 11 so that when the drum revolves and passes the stop the valve will be swung open and the contents of the drum allowed to fall out. As soon as the valve has moved past the stop the spring device will close the valve and hold it shut until the drum makes another revolution.

To revolve the drum we provide a ratchet wheel 14 on one of the pivots 9 and mount a bail 15 on the said pivots, said bail having a dog 16 that engages the teeth of the ratchet wheel 14 and is held in engagement therewith by a spring 17. A dog 18 prevents backward movement of the ratchet wheel. When the bail 15 is oscillated up and down the ratchet wheel will be revolved and the drum will turn with it. A float 19 is provided in said tank having a stem 20 provided with a series of holes 21 and a screw 22 passes through said bail and through one of the holes 21 in the stem 20, and by shifting the position of the screw in the stem the elevation of the float in the tank can be changed according to the amount of water therein or the time of movement desired for the drum. A bracket 23 depends from the frame 4 and a link 24 pivotally connects the said bracket with the stem 20 and serves to guide the stem and bail in their up and down movement. A lug 25 serves to limit the downward movement of the bail 15 and a plate 26 is mounted on the pivot of the drum and is adjustable by means of a slot 27 and screw 28, and has a lug 29 which overhangs the bail and limits its upward movement. By the adjustment of this plate the up stroke of the bail may be regulated and the dog 16 allowed to slide over one or more of the teeth of the ratchet wheel as desired.

In operation, water entering the tank will raise the float 19 and with the upward movement of the float the dog 16 will slide over the ratchet and when the float descends as the water recedes the ratchet wheel and the drum will be revolved a step and this movement will continue with each operation of the float. When the valve 11 arrives opposite the stop on the frame and is actuated thereby a portion of the contents of the drum will be allowed to drop out in the water in the tank. As soon as the valve has moved by the stop its spring will close it and the drum will continue its revolution as the float is raised and lowered.

We claim as our invention:

1. The combination, with a tank, of a revolving drum adapted to contain a disinfecting agent and having a suitable discharge opening and a valve therefor, a float connected with said drum and arranged to revolve it with a step by step movement, and means for opening said valve at a predetermined point in the revolution of said drum to discharge a portion of said disinfecting agent.

2. The combination, with a tank, of a revolving receptacle having a discharge opening and a normally closed valve therefor, means for opening said valve at a predetermined point in the revolution of said receptacle, and means for operating said receptacle.

3. The combination, with a water closet tank, of a revolving receptacle adapted to contain a disinfecting agent and having a feed opening, a valve normally closing said opening, means for opening said valve at predetermined intervals, and a float connected with said receptacle and having an up and down movement, and mechanism whereby said receptacle will be revolved step by step with the movement of said float.

4. The combination, with a tank, of a revolving receptacle thereon having a feed opening and a valve therefor, means for opening said valve once with every revolution of said receptacle, a float, and mechanism connecting said float with said drum, whereby upon the movement of said float a rotary movement will be imparted to said drum.

5. The combination, with a tank, of a drum having a feed opening and a valve therefor, means for opening said valve at predetermined intervals, an oscillating bail, a ratchet wheel, a dog mounted on said bail and adapted to engage the teeth of said ratchet, a float adjustably connected with said bail and adapted to rise and fall therewith, the upward movement of said bail causing the dog to slide over the teeth of said ratchet, and the weight of said float returning said bail to its normal position and revolving said ratchet and drum, substantially as described.

6. The combination, with a tank, of a revolving drum having a feed opening and a valve therefor, means for opening said valve at predetermined intervals, an oscillating bail having a ratchet connection with said drum, a float connected with said bail and adapted to rise and fall in said tank, and means for limiting the stroke of said bail, substantially as described.

In witness whereof, we have hereunto set our hands this 5th day of June 1907.

SVEN A. SHIPP.
LAWRENCE LUND.

Witnesses:
  RICHARD PAUL,
  J. B. EVA.